United States Patent [19]

Lantin et al.

[11] 4,323,442
[45] Apr. 6, 1982

[54] ELECTROLYSIS INSTALLATION FOR THE PRODUCTION OF GAS

[75] Inventors: Patrice Lantin, Givry; Gérard Père, Le Breuil, both of France

[73] Assignee: Creusot-Loire, Paris, France

[21] Appl. No.: 165,368

[22] Filed: Jul. 2, 1980

[30] Foreign Application Priority Data

Jul. 5, 1979 [FR] France ............... 79 17929

[51] Int. Cl.³ .............. C25B 15/08; C25B 9/00
[52] U.S. Cl. .................... 204/237; 204/258; 204/266
[58] Field of Search ............... 204/252–258, 204/263–266, 237, 129

[56] References Cited

U.S. PATENT DOCUMENTS

| | | | |
|---|---|---|---|
| 2,377,823 | 6/1945 | Stewart | 204/266 X |
| 2,695,874 | 11/1954 | Zoansky | 204/258 |
| 2,846,384 | 8/1958 | Denora | 204/129 |
| 3,736,322 | 5/1973 | Helber et al. | 204/266 |
| 4,136,005 | 1/1979 | Persson et al. | 204/266 |
| 4,235,694 | 11/1980 | Hall | 204/129 X |

Primary Examiner—Delbert E. Gantz
Assistant Examiner—Donald R. Valentine
Attorney, Agent, or Firm—Pollock, Vande Sande & Priddy

[57] ABSTRACT

An electrolysis installation such as an installation intended for the industrial production of hydrogen and oxygen by electrolysis of water under pressure having separate anolyte and catholyte flow circuits is provided with an electrolyzer (1) equipped with diaphragms which are permeable to liquids and impermeable to gases and is further provided with means, such as the flow control devices (18, 3) enabling a partial transfer of electrolyte to be effected from each catholyte compartment to the corresponding anolyte compartment, in such a manner as to preserve similar electrolyte densities for each of the anolyte and catholyte flow circuits.

8 Claims, 3 Drawing Figures

ELECTROLYSIS INSTALLATION FOR THE PRODUCTION OF GAS

BACKGROUND OF THE INVENTION

The present invention relates to an electrolysis installation, such as an installation adapted for the industrial production of hydrogen and oxygen by electrolysis of water under pressure.

In the electrolysis installations known at present, for example as described in the French Patent Application filed on the Apr. 2, 1979 by the Applicant under No. 79 08694, the return circuits of anolyte and catholyte originating from the separators are united in one and the same pipeline which makes it possible thus to obtain equal densities of potash at the input of the electrolyzer at the anode side and at the cathod side. This joining of the return circuits of degassed electrolyte makes it possible, by ensuring equal densities of potash at each of the two inlets of the electrolyzer, to avoid a drop in the performance of the electrolyzer in the course of its operation, which would be due to the increase in the density of potash at the cathode side and the correlative reduction of this at the anode side. It is actually known that the electrolysis reaction leads to a loss of potash and a gain in water at the anode side and vice versa at the cathode side; now the resistivity of the electrolyte depends on the density of this in potash, and increased if there is a substantial deviation at one side or the other of the optimum density. It is therefore essential, in order to operate with a satisfactory performance, always to keep the potash densities at the inlets of the electrolyzer close to the optimum density corresponding to the minimum of resistivity of the electrolytic mixture.

With the known instalations, it is essential, in order to avoid the risks of explosions due to possible mixtures of hydrogen gas and oxygen, to be equipped with very effective liquid-gas separators, which should degas the whole of the electrolyte flow in circulation. Such gas removers are bulky and expensive and it would be desirable to be able to equip the electrolysis installation with less sophisticated gas removing devices.

SUMMARY OF THE INVENTION

The present invention relates to a novel type of electrolysis installation which, while operating with an optimum efficiency like the installations mentioned above, does not have the disadvantages thereof, since it can be equipped with much more simple and much less bulky gas removers. Such an installation is of the type according to which the anolyte and catholyte circuits are separated, and it is characterized in that it is provided with an electrolyzer equipped at least partially with diaphrams which are permeable to liquids and impermeable to gases and in that it is further provided with means enabling a partial transfer of electrolyte to be effected in the electrolyzer, through said diaphragms, from each catholyte compartment towards the corresponding anolyte compartment, in such a manner as to preserve similar electrolyte densities for each of the anolyte and catholyte flow circuits.

BRIEF DESCRIPTION OF THE DRAWINGS

The invention will be better understood by means of the following description of some examples of embodiment, with reference to the accompanying drawings in which.

DESCRIPTION OF AN EMBODIMENT

Figure 1:
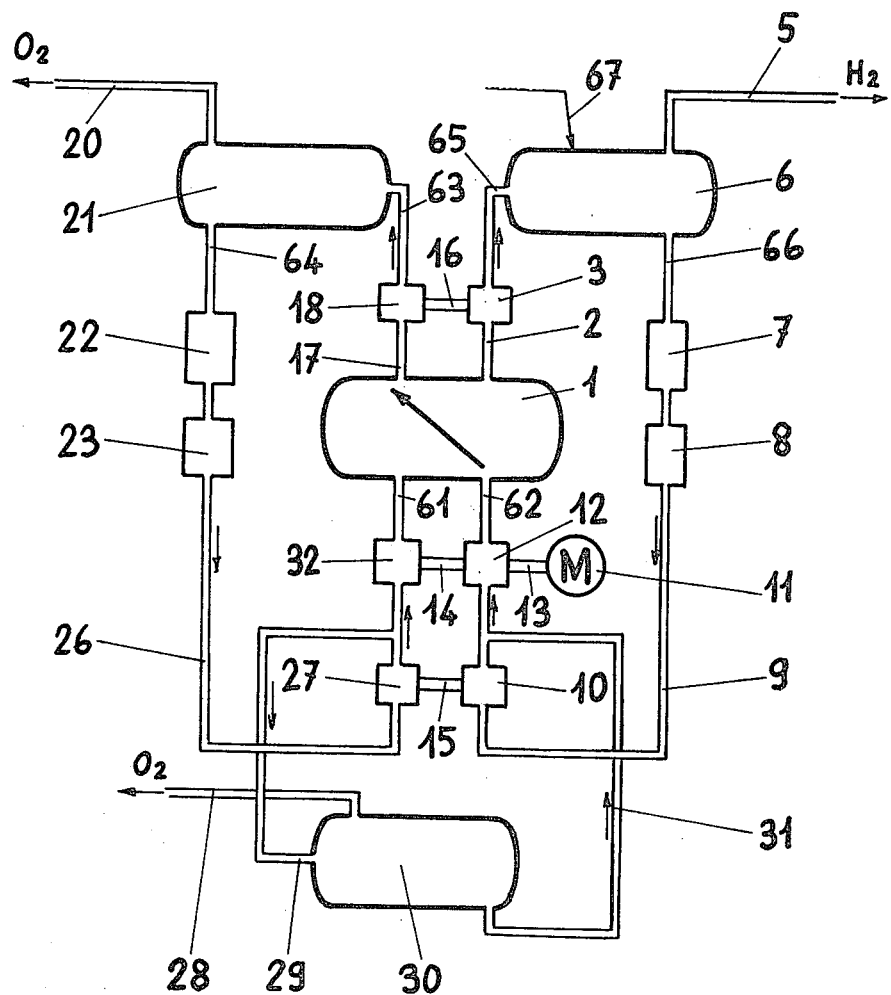
FIG. 1 illustrates diagrammatically one example of embodiment of a water electrolysis installation according to the invention.

In FIG. 1, the electrolyzer equipping the installation for the electrolysis of water under pressure illustrated and according to the invention is designated by the reference 1. The electrolyzer 1 has its electrolysis cells equipped with diaphragms for separating the anolyte and catholyte into separate compartments and consisting of a material impermeable to gases, for example not allowing bubbles of gas of a diameter greater than 10 microns to pass, but of sufficient porosity to be permeable to liquids; for example, these diaphragms are of asbestos, a material which has such properties.

In conventional manner, the electrolyzer 1 is provided with an anolyte outlet 17, with a catholyte outlet 2, and with an electrolyte inlet 61 intended for the anolyte compartments and an electrolyte inlet 62 intended for the catholyte compartments. Likewise in conventional manner, the anolyte leaving 17 is taken, by means of a circuit 63, to an anolyte gas remover 21 where the oxygen is extracted by means of a gas outlet conduit 20. Likewise in conventional manner, the degassed anolyte is discharged from the gas remover 21 through an outlet 64 and then enters a refrigerating circuit 22 and a filter 23.

Likewise, and in a symmetrical manner, the catholyte leaving the electrolyzer 1 at 2 passes successively through a connection circuit 65, a catholyte gas remover 6, itself provided with a hydrogen outlet conduit 5, then leaves the gas remover 6 through an outlet 66 and passes through a refrigerating circuit 7 and a filter 8.

According to the invention, the return circuits (26, 9) for the anolyte and catholyte leaving the filters 23 and 8 are not, as in the majority of known installations, united in a single conduit, but remain separated between the conduits (26, 9) and the corresponding inlets (61, 62) in the electrolyzer 1. Nevertheless in order to preserve, in each electolysis cell, the optimum concentration of potash corresponding, to within about ±10%, to the density, generally of the order of 1.3, giving the electrolyte the minimum resistivity, the installation is further equipped with means permitting, by creating a difference in catholyte-anolyte flow in the electrolyzer, to cause a well defined portion, generally of the order of 10 to 20%, of the catholyte flow to pass permanently, through each diaphragm, into the anolyte compartments. These means, as shown diagrammatically in the example of embodiment of FIG. 1, are the following:

Placed upstream of the electrolyzer, in conventional manner are geared circulation pumps, respectively a pump 32 on the anolyte circuit and a pump 12 on the catholyte circuit. These pumps deliver flows in the ratio close to ($\frac{1}{3}$, $\frac{2}{3}$) necessary in the case of the electrolysis of water. For this, a reliable and economical manner, known and illustrated in the drawing, consists in driving, through a common motor 11 and a shaft 13, the two geared pumps 12 and 32, themselves coupled by a shaft 14, and in giving the gearwheels of each pump identical diameters for corresponding wheels, but gearing widths in the ratio close to the ratio ($\frac{1}{3}$, $\frac{2}{3}$) required for the ratio of flows.

So as to cause the transfer by suction of a well defined portion of the catholyte flow to the anolyte flow, as indicated very diagrammatically by the arrow in the drawing, a geared regulator (18, 16, 3) as described in the Applicant's Patent Application No. 79.08694 is placed at the outlet of the electrolyzer 1. Such a regulator is composed of two flow control devices (18, 3) coupled by a shaft 16 and each consisting of toothed wheels meshing one in the other as is the case for geared volumetric pumps. According to the present invention, the width of the teeth of the devices 18 and 3, relating respectively to the anolyte circuit and to the catholyte circuit, is regulated so that their ratio is 10 to 30% greater than that existing for the pumps 32 and 12. For example, instead of being in the ratio ($\frac{1}{3}$, $\frac{2}{3}$), they are in the ratio (0.37, 0.62). The difference in the flows then causes the desired suction of some of the catholyte circuit towards the anolyte circuit, so that a sufficiently slight difference in density to ensure a satisfactory efficiency of the electrolyzer is guaranteed for these two circuits. To give some idea, if the optimum density is 1.3, densities are obtained deviating up to 10% at each side of this value.

Nevertheless, since the anolyte and catholyte circuits are separate, it is necessary, because 10 to 20% of the flow of the second is permanently transferred to the first, to compensate this transfer by permanently deflecting an equal proportion of anolyte towards the catholyte circuit, without which the catholyte circuit would be emptied completely.

According to the invention, the means used for this purpose are the following:

on the one hand, the water (or more generally the base liquid in the case of the electrolysis of a liquid other than water) intended to compensate for that consumed naturally by the electrolysis phenomenon is added, as illustrated at 67, in the cathode gas remover 6 alone;

on the other hand, a small portion, of the order of 10 to 20%, of the anolyte flow is diverted through a conduit 29, and it is reinjected through a conduit 31 into the catholyte circuit, after having been caused to pass through a gas remover 30, of small dimensions, adapted to effect at 28 the far-reaching separation of the oxygen of the diverted anolyte circuit, so as to avoid the introduction of bubbles of this gas into the catholyte circuit.

As illustrated in the drawing, the diversion (29, 30, 31) is effected upstream of the volummetric pumping device (32, 12) and, so as to enable the necessary percentage to be diverted, corresponding to the transfer flow of the invention, a flow regulator (27, 15, 10) substantially identical to the regulator (18, 16, 3) is placed on the two electrolyte circuits, upstream of the diversion means 29 and 31.

The electrolysis installation which has just been described makes it possible to have separate anolyte and catholyte circuits, while remaining within the optimum conditions to have the best yield of the electrolysis reaction. It is then not necessary to have a total gas-liquid separation, up to 99%, as for the devices previously known and it is sufficient to degas up to 90% for example. The necessary gas removers 21 and 6 are then of much smaller dimensions than the gas removers used in the preceding devices. Nevertheless, an additional gas remover 30 is necessary in the flow compensation circuit (29, 30, 31), but this is of small dimensions, since it only has to effect the separation in a small proportion of the total flow of anolyte.

Figure 2:
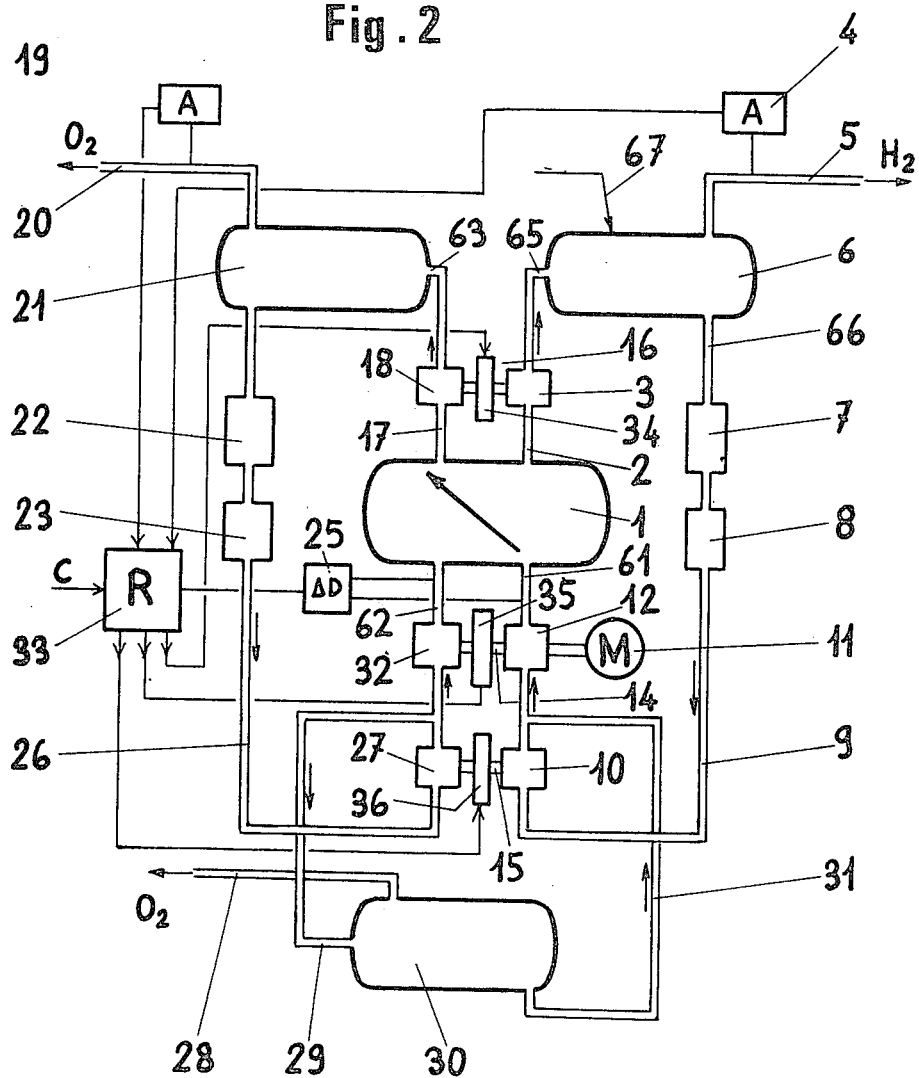
FIG. 2 illustrates diagrammatically a modified embodiment of the water electrolysis installation of FIG. 1.

FIG. 2 shows diagrammatically an installation of the type previously described with reference to FIG. 1, but having some improvements conditional on a greater complexity.

The installation of FIG. 2 differs from the previous one in that it comprises, on the coupling shafts (16, 15) of the geared regulators (18, 3) and (27, 10), as well as on the coupling shaft (14) of the circulation pumps (32, 12), speed variators (34, 35, 36) which may advantageously be remote-controlled pneumatically from a regulator 33, depending on one or more set values C corresponding to one or more conditions desired for the electrolyte densities and possibly, as is the case here, for the purity of the gases extracted. The regulator 33 therefore compares the set values C with the input signals originating from a differential densimeter 25 placed between the catholyte and anolyte inlet circuits 61 and 62 in the electrolyzer 1, from a gas analyzer 19 placed on the oxygen oultet circuit 20, and from a gas analyzer 4 placed on the hydrogen outlet circuit 5. In conventional manner, the regulator 33 supplies the variators 34, 35 and 36 with the signals enabling the ratios of flows to be caused to vary in the regulators and corresponding pumps in such a manner that the information originating from the control elements (4, 19, 25) corresponds to the set values C.

It will be noted that, with the object of checking satisfactory operation, the installation of FIG. 1 may likewise be equipped with gas analyzers, such as 4 and 19, and with a differential densimeter such as 25, the regulator 33 being replaced by a simple threshold alarm device, triggered in the event of an anomaly caused, for example, by cracks in the diaphragm.

The means enabling the partial transfer to be effected through the diaphragms, according to the invention, may be very varied, and another example of this will now be given with reference to FIG. 3 where these means are based on the differences of pressures instead of being based, as before, on the differences of flows.

Figure 3:
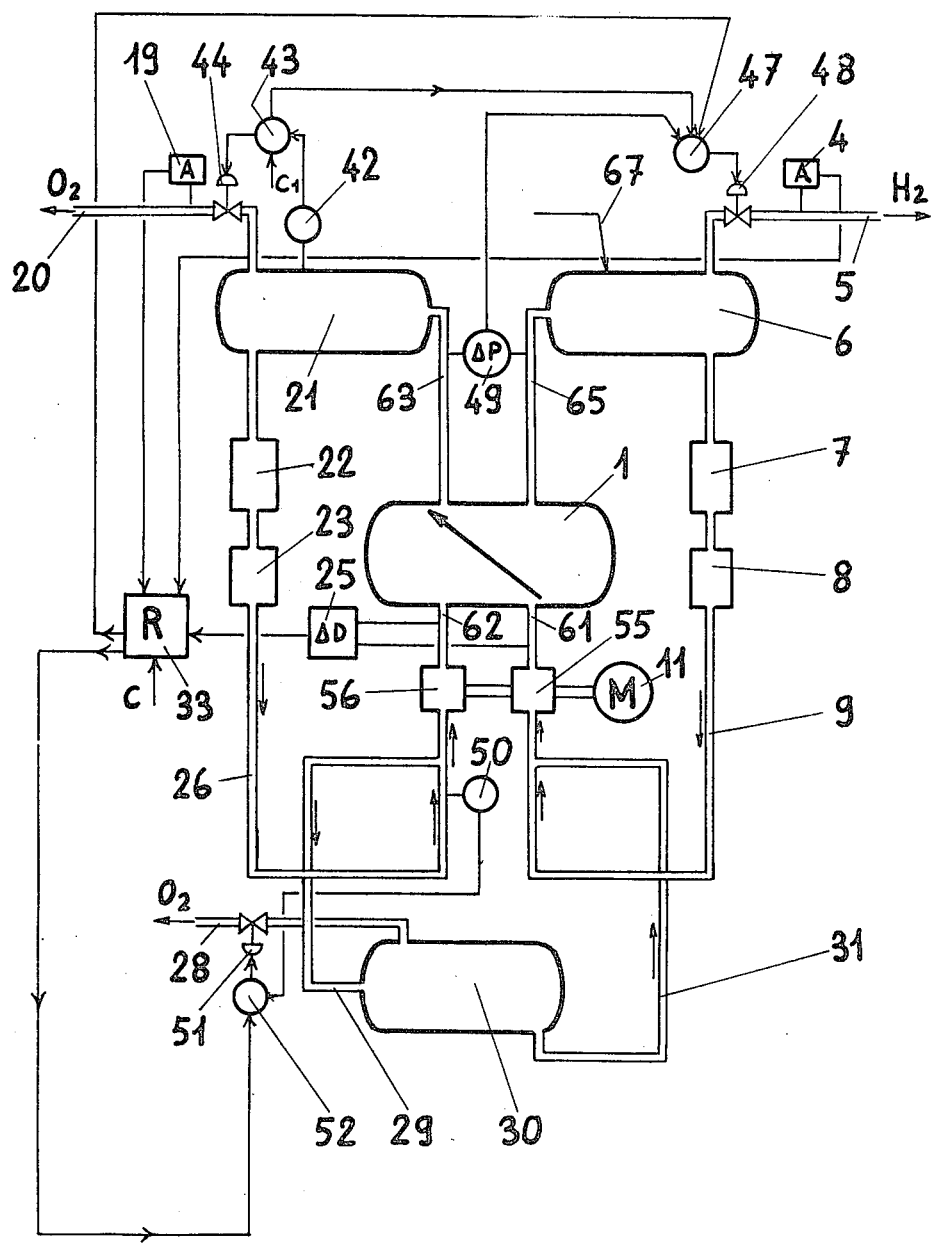
FIG. 3 illustrates diagrammatically another example of embodiment of a water electrolysis installation according to the invention.

As will be seen from the drawing, the installation of FIG. 3 has great analogies with that of FIG. 2 and the elements having identical functions in the two installations have been designated by the same reference numerals. The installation of FIG. 3 does not comprise any flow regulation devices, so that the transfer of the invention as well as the compensation of this by the reinjection circuit (29, 30, 31) is obtained by acting on the pressures of the two anolyte and catholyte circuits.

For this purpose, the oxygen pressure in the anode separator 21 is maintained constant by a conventional pressure regulation loop comprising a regulator 43 acting on a valve 44, situated at the oxygen outlet 20, depending on the signals transmitted by a pressure transmitter 42, connnected to the gas remover 21 and an instruction C1. On the other hand, the hydrogen pressure in the cathode separator 6 is maintained, by means of a regulator 47 acting on a valve 48, at a value higher than that of the preceding pressure of the anolyte circuit, and fixed by the instruction C of the regulator 33 is such a manner as to permit, through difference in pressures, the transfer through the diaphragms of the electrolyzer 1 which enables a difference in potash density not exceeding about 20% to be obtained between the two anolyte and catholyte circuits. Likewise acting on the regulator 47 are, on the one hand a signal originating from the regulator 43 enabling a satisfactory followup of the hydrogen pressure to be ensured depending on the oxygen pressure, and on the other hand a signal originating from a differential pressure transmitter 49 placed between the conduits 63 and 65 and serving as a monitoring device for the difference in pressure actually obtained in relation to that fixed by means of the instruction C. Finally, as in the case of the installation of FIG. 2, the regulator 33 likewise receives signals originating from the differential densimeter 25 and from the gas analyzers 4 and 19.

In the installation of FIG. 3, the flow loss compensation diversion (29, 30, 31) is likewise actuated by pressure means. For this, the separator 30 has its pressure fixed by means of a valve 51 placed on its oxygen outlet circuit 28 and controlled by a regulator 52 receiving, on the one hand a signal originating from a pressure pick-off 50 placed on the anolyte return circuit 26 upstream of the diversion 29, and on the other hand a signal originating from the general regulator 33. Under control of the regulators 52 and 33, a given pressure is thus fixed at the separator 30 in such a manner as to divert the desired compensatory flow from the circuit 26 to the circuit 9, as in the case of the installation of FIG. 2.

The main use of the invention is for the production of hydrogen and oxygen by electrolysis of water under pressure.

We claim:

1. An electrolysis installation having separate anolyte and catholyte flow circuits and gas outlets, and whereby degassed electrolyte is recycled by means of pumps to an electrolyzer and comprising an electrolyzer equipped at least partially with diaphragms separating the anolyte and catholyte into separtate compartments and which are permeable to liquids and impermeable to gases; and means based on the creation of differences in flow enabling a partial transfer of electrolyte to be effected in the electrolyzer, through said diaphragms, from each catholyte compartment to the corresponding anolyte compartment, in such a manner as to preserve similar electrolyte densities for each of the anolyte and catholyte flow circuits; said means comprising, downstream of the electrolyzer, an anolyte flow control device coupled to a catholyte flow control device, said devices being dimensioned to impose an anolyte-catholyte flow ratio greater than that existing at the inlets of the recycled electrolyte to the electrolyzer, of the amount necessary to effect, by suction, said transfer through said diaphragms.

2. An electrolysis installation as claimed in claim 1, which further comprises upstream of the electrolyzer means enabling a compensatory reinjection of some of the anolyte flow to be effected into the catholyte flow circuit.

3. An electrolysis installation as claimed in claim 2, further comprising, upstream of the reinjection means, coupled flow control devices substantially identical to the flow control devices placed downstream of the electrolyzer.

4. An electrolysis installation as claimed in claim 3, wherein at least one of said coupled flow control devices is coupled by means of a speed variator.

5. An electrolysis installation as claimed in claim 3, wherein said pumps are coupled by means of a speed variator.

6. An electrolysis installation as claimed in claim 4 or 5, wherein said speed variator is remote-controlled from a regulator circuit.

7. An electrolysis installation having separate anolyte and cahtolyte flow circuits and gas outlets whereby degassed electrolyte is recycled to an electrolyzer, and comprising an electrolyzer equipped at least partially with diaphragms separating the anolyte from the catholyte into separate compartments and which are permeable to liquids and impermeable to gases; and means, based on the creation of differences in pressure, enabling a partial transfer of electrolyte to be effected in the electrolyzer, through said diaphragms, from each catholyte compartment to the corresponding anolyte compartment, in such a manner as to preserve similar electrolyte densities for each of the anolyte and catholyte flow circuits; said means comprising valves placed at the gas outlets and controlled by means of regulators.

8. An electrolysis installation as claimed in claim 1 or 7, which further comprises an inlet to compensate for the loss of base liquid consumed by the electrolysis reaction, placed on the catholyte flow circuit alone.

* * * * *